(12) United States Patent
Wang et al.

(10) Patent No.: US 12,074,770 B2
(45) Date of Patent: Aug. 27, 2024

(54) COORDINATION OF COMMUNICATION BETWEEN CLOUDS AND A LIFE CYCLE MANAGER TO CONTROL VIRTUAL NETWORK FUNCTIONS ON SAID CLOUDS

(71) Applicant: RAKUTEN MOBILE, INC., Tokyo (JP)

(72) Inventors: Yidao Wang, Tokyo (JP); Siddharth Joshi, Indore (IN); Takatsugu Ishikawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/920,996

(22) PCT Filed: Jun. 17, 2022

(86) PCT No.: PCT/JP2022/024295
§ 371 (c)(1),
(2) Date: Oct. 24, 2022

(87) PCT Pub. No.: WO2023/243076
PCT Pub. Date: Dec. 21, 2023

(65) Prior Publication Data
US 2024/0223460 A1    Jul. 4, 2024

(51) Int. Cl.
*H04L 67/306*  (2022.01)
*H04L 41/122*  (2022.01)
*H04L 41/5003*  (2022.01)
*H04L 67/10*  (2022.01)
*H04L 67/1095*  (2022.01)

(52) U.S. Cl.
CPC .......... *H04L 41/122* (2022.05); *H04L 67/10* (2013.01)

(58) Field of Classification Search
CPC ..... H04L 41/122; H04L 67/10; H04L 67/306; H04L 41/5003; H04L 67/18; H04L 67/1095
USPC ........................................ 709/223
See application file for complete search history.

(56) References Cited

U.S. PATENT DOCUMENTS

| | | | |
|---|---|---|---|
| 10,404,732 B2 * | 9/2019 | Munro | G06F 21/552 |
| 10,728,054 B2 * | 7/2020 | Yu | H04L 67/10 |
| 10,893,425 B2 * | 1/2021 | Baillargeon | H04W 24/02 |
| 11,076,004 B2 * | 7/2021 | Yerli | H04L 41/0896 |

(Continued)

*Primary Examiner* — Jude Jean Gilles
(74) *Attorney, Agent, or Firm* — Sughrue Mion, PLLC

(57) ABSTRACT

The communication network system according to the present disclosure comprises: a life cycle manager (LCM) that transmits a request for virtual network function (VNF) setting to one or more clouds; and a cloud adapter that mediates communication between the LCM and the cloud to which the request is addressed, The cloud adapter creates, based on a response to the request from the cloud to which the request is addressed, a common-format management ID independent of the type of the cloud to which the request is addressed, and transmits the management ID to the LCM.

The LCM may transmit a query regarding a processing status of the request to the cloud adapter, including the management ID.

The cloud adapter may recognize the cloud to which the query is addressed on the basis of the management ID and query the cloud to which the query is addressed such that the cloud returns the processing status.

11 Claims, 8 Drawing Sheets

(56) References Cited

U.S. PATENT DOCUMENTS 11,175,955 B2 * 11/2021 Meng .................... G06F 9/5061
11,240,135 B1 * 2/2022 Melkild .................... G06F 9/48

* cited by examiner

COORDINATION OF COMMUNICATION BETWEEN CLOUDS AND A LIFE CYCLE MANAGER TO CONTROL VIRTUAL NETWORK FUNCTIONS ON SAID CLOUDS

CROSS REFERENCE TO RELATED APPLICATIONS

This application is a National Stage of International Application No. PCT/JP2022/024295 filed Jun. 17, 2022.

TECHNICAL FIELD

The present disclosure relates to a communication network system that sets a VNF, a cloud adapter for setting a VNF, and a VNF setting method.

BACKGROUND

In a communication network system, managing the status of virtual network functions (VNFs), which are necessary for the provision of services provided via the communication network system, or in other words, VNF life cycle management, is critical. Further, it is possible for VNFs to be created in environments managed by a vendor different than that of the communication network system, for example, on a cloud outside the communication network system.

SUMMARY OF INVENTION

Technical Problem

Even if a cloud as described above receives a request for VNF setting, for example, a request for VNF deployment (creation), from a life cycle manager (hereinafter, life cycle manager is written as LCM), which performs life cycle management, the cloud does not reply regarding the processing status. Thus, the communication network system queries each cloud and confirms whether the setting was processed normally. The querying can be performed periodically until it can be confirmed that the setting has been processed normally.

The clouds can be broadly classified into type 1 clouds and type 2 clouds. Upon receiving a request for VNF setting, type 1 clouds return an identifier (ID) pertaining to the request (job). When a query of a type 1 cloud is performed using the ID, the status of a process corresponding to the ID is returned. Even if a type 2 cloud receives a request for VNF deployment, the type 2 cloud does not return an ID pertaining to the request.

In this manner, the response to a request for VNF deployment differs depending on the type of the cloud, so the LCM must handle the processing status of VNF deployment requests for each cloud individually. However, causing an LCM to perform individual cloud handling further increases the load on the LCM, which is already high.

The present disclosure standardizes the processing for VNF setting requests from an LCM to clouds and suppresses the load on the LCM even if the LCM simultaneously manages VNFs for different types of clouds.

Solution to Problem

The communication network system according to the present disclosure comprises: a life cycle manager (LCM) that transmits a request for virtual network function (VNF) setting to one or more clouds; and a cloud adapter that mediates communication between the LCM and the cloud to which the request is addressed.

The cloud adapter creates, based on a response to the request from the cloud to which the request is addressed, a common-format management ID independent of the type of the cloud to which the request is addressed, and transmits the management ID to the LCM.

The LCM may transmit a query regarding a processing status of the request to the cloud adapter, including the management ID.

The cloud adapter recognizes the cloud to which the query is addressed on the basis of the management ID and may query the cloud to which the query is addressed such that the cloud returns the processing status.

The cloud adapter according to the present disclosure comprises a processor.

Mediation of communication between a life cycle manager (LCM) that transmits a request for virtual network function (VNF) setting to one or more clouds and the cloud to which the request is addressed is executed by at least one of the one or more processors.

Here, in the mediation of communication, creation, on the basis of a response to the request from the cloud to which the request is addressed, of a common-format management ID independent of the type of the cloud to which the request is addressed and transmission of the management ID to the LCM are executed.

The method for mediating communication according to the present disclosure is a method for mediating communication between a life cycle manager (LCM) that transmits a request for virtual network function (VNF) setting to one or more clouds and the cloud to which the request is addressed.

In the mediation of communication, creation, on the basis of a response to the request from the cloud to which the request is addressed, of a common-format management ID independent of the type of the cloud to which the request is addressed and transmission of the management ID to the LCM are executed.

DESCRIPTION OF EMBODIMENTS

Hereafter, one embodiment of the present disclosure will be explained in detail with reference to the drawings.

Figure 1:
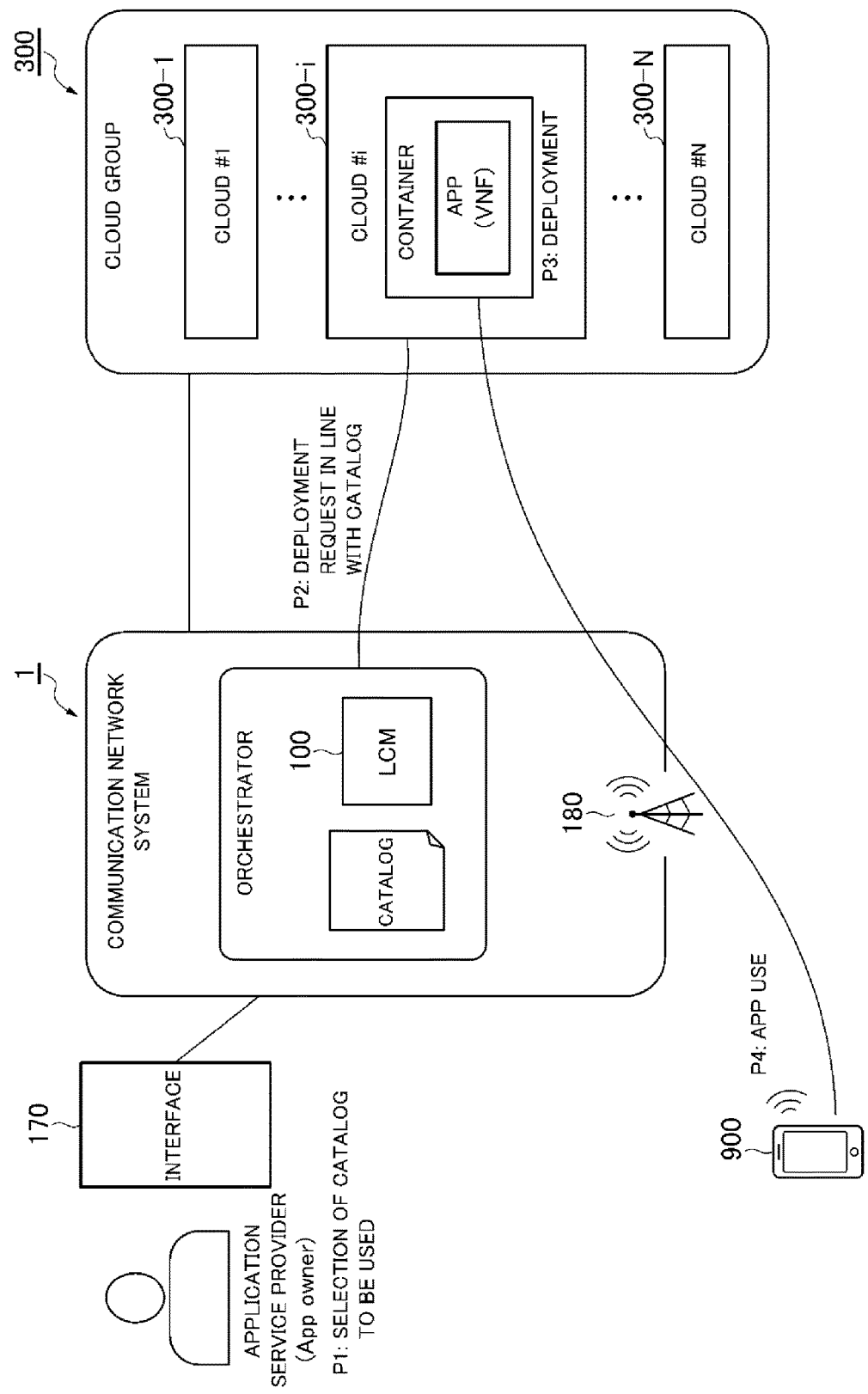
FIG. 1 is a conceptual diagram illustrating an existing embodiment.

FIG. 1 is a conceptual diagram illustrating an existing embodiment. FIG. 1 illustrates a communication network system 1, a cloud group 300, and an information processing apparatus 900 and it is assumed that communication between the cloud group 300 and the information processing apparatus 900 is carried out via the communication network system 1.

The information processing apparatus 900 may be a mobile apparatus such as a smartphone or may be a fixed apparatus.

A base station 180 is illustrated in FIG. 1, but when the information processing apparatus 900 is a mobile apparatus, this shows that the information processing apparatus 900 is communicatively connected to the communication network system 1 via the base station 180, which emits radio waves for wireless communication. However, communication between the information processing apparatus 900 and the communication network system 1 may be wired communication and in that case, the base station 180 may be absent.

The cloud group 300 represents N clouds from a first cloud ("cloud #1") to an N-th (N is an integer that is no less than one) cloud ("cloud #N"). In FIG. 1, the reference number for the i-th (i is an integer that is no less than one and no greater than N or less) cloud ("cloud #i") is shown as 300-*i*. The communication network system 1 is assumed to be independently communicatively connected to each cloud in the cloud group 300.

It is assumed that each cloud in the cloud group 300 may be an independent environment (system) and some or all of the cloud group 300 may be in an environment managed by a vendor different than that of the communication network system 1. Therefore, in the example in FIG. 1 the cloud group 300 is illustrated as being outside the communication network system 1. However, if the environment is that managed by a different vendor, one or more clouds in the cloud group 300 may be within the communication network system 1. Further, it is possible for each cloud to be managed by vendors that are different than one another.

Applications for providing various services to the information processing apparatus 900 via the communication network system 1 can be deployed to each of the N clouds. More specifically, each cloud can construct virtual environments such as containers and the applications are deployed as virtual network functions (VNFs) in the virtual environments. In other words, the VNFs implementing the applications are created in containers on each cloud.

Further, an interface 170 is illustrated in FIG. 1, but this illustrates an application service provider which intends to create an application in a cloud and provide a service through the application requesting creation of an application of the communication network system 1 via the interface 170.

Moreover, an orchestrator is shown in the communication network system 1 and the orchestrator is a system which governs execution, management, repair, and the like of functions which are executed on the communication network system 1 such as network slicing. This will be discussed in detail below, but the orchestrator may maintain a file called a catalog which includes application setting information and is used when requesting application creation.

Further, an LCM 100 is shown within the orchestrator. The LCM 100 is a constituent element of the orchestrator and manages the VNFs of the clouds in the cloud group 300 created via the communication network system 1. The LCM 100 may be one apparatus or may be a system constructed from multiple apparatuses.

The application deployment procedure shall be explained simply, referring to FIG. 1. First, via the interface 170 of the communication network system 1, the application service provider selects a catalog (see reference number P1) to be used in the creation of an application on the basis of the function or the like of the application.

The LCM 100 selects one cloud from the cloud group 300 based on the selected catalog, the free resources of the clouds, and the like. Here, cloud #i is assumed to have been selected. In addition, the LCM 100 requests deployment (creation) of a VNF of cloud #i in line with the catalog (see reference number P2).

Cloud #i deploys a VNF corresponding to the request. That is, a VNF is created in the container on cloud #i (see reference number P3).

A user intending to use the application accesses the VNF on cloud #i, which is the deployment destination, with the information processing apparatus 900 and uses the application (see reference number P4).

Here, it must be noted that the types of the clouds in the cloud group 300 are not the same. The clouds can be broadly classified into type 1 clouds and type 2 clouds.

Type 1 clouds provide an identification number (job ID) in response to a VNF setting request (job). The VNF setting is VNF creation (deployment), VNF deletion, a VNF change, or the like. Upon receiving a query using a job ID from the LCM 100, the type 1 cloud provides the processing status (also called "job status") of the VNF setting corresponding to the job ID to the LCM 100.

In contrast, even if a type 2 cloud receives a VNF setting request, the type 2 cloud does not provide a job ID pertaining to the request to the LCM 100. As such, the LCM 100 cannot use a job ID to query a type 2 cloud for the processing status of a VNF setting.

As examples of type 1 clouds, there are clouds that comprise a job management engine (also called a "workflow engine"), which stores the job history. Examples of type 1 clouds include, for instance, clouds by means of the Robin platform using a Robin application as the base application. A Robin application is created using a Robin bundle.

As examples of type 2 clouds, there are clouds that do not comprise a job management engine. Examples of type 2 clouds include, for instance, clouds managed simply by Kubernetes. The package manager Helm is used to create applications in such clouds.

As discussed below, type 2 clouds can further be broadly classified into two classes depending on the presence or absence of labels. Type 2 clouds with labels are those which add release names for VNF setting requests (particularly VNF creation requests) as labels to the VNFs. Type 2 clouds without labels are those which do not add release names for VNF setting requests as labels to the VNFs.

Accordingly, the LCM 100 can query type 1 clouds for a processing status with a job ID obtained when a VNF setting was requested. However, the LCM 100 cannot query type 2 clouds for a processing status independent of another technique because a job ID cannot be used.

In this manner, in the existing embodiment, the LCM 100 must handle the processing status of VNF settings for each cloud individually.

Thus, in the embodiment of the present disclosure, a cloud adapter 200 that mediates communication between the LCM 100 and the cloud group 300 in FIG. 1 is set up.

Figure 2A:
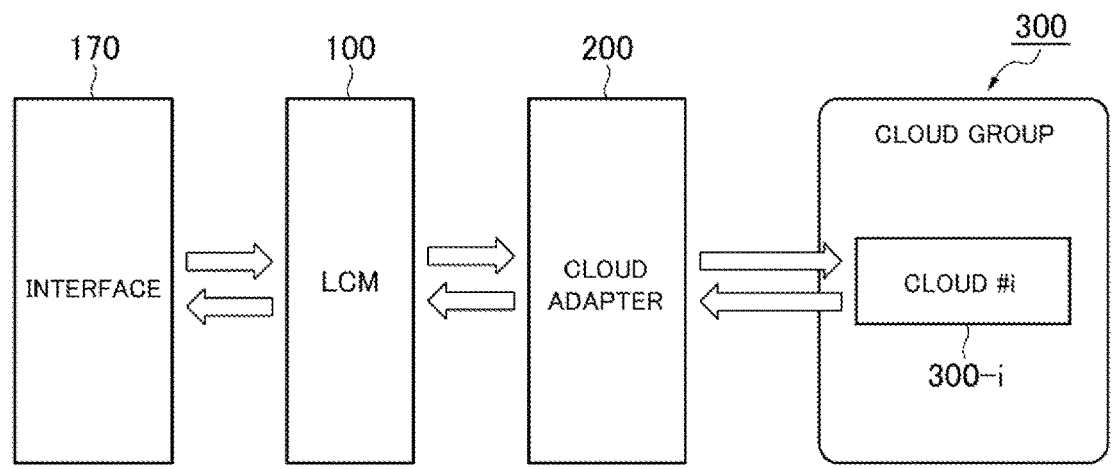
FIG. 2A is a conceptual diagram illustrating a portion of the present embodiment.

FIG. 2A is a conceptual diagram illustrating a portion of the present embodiment. The cloud adapter 200 is interposed between the LCM 100 and the cloud group 300.

The LCM 100 accepts VNF setting requests for the cloud group 300 and transmits requests for virtual network function (VNF) setting thereto.

The cloud adapter 200 acquires VNF setting requests to the cloud group 300 from the LCM 100 and requests VNF setting of the cloud group 300.

As discussed above, VNF setting may be VNF creation (deployment), VNF deletion, or a VNF change in the cloud group 300.

When creating a VNF, the cloud adapter 200 selects one cloud from the cloud group 300 based on the selected catalog, the free resources of the clouds, and the like (this is considered to be "cloud #i" in FIG. 2A in the same manner as the example in FIG. 1) and creates the VNF there. When deleting or changing a VNF, one cloud with a VNF from those in the cloud group 300 may be designated.

That is, by using the catalog, it is possible for the LCM 100 not to recognize whether the request for any cloud in the cloud group 300 will be performed and the cloud adapter 200 can determine the address of the request.

When requesting VNF setting, the cloud adapter 200 creates a management ID. The management ID is the same format regardless of the type of the cloud setting the VNF (that is, whether the cloud is a type 1 cloud or a type 2 cloud). The cloud adapter 200 provides the created management ID to the LCM 100.

Upon VNF setting being requested in the communication network system 1 including the cloud adapter 200 according to the present embodiment, the cloud adapter 200 selects either a type 1 cloud or a type 2 cloud and performs the VNF setting. Furthermore, the cloud adapter 200 creates a management ID with the same format regardless of whether VNF setting was performed on a type 1 cloud or a type 2 cloud.

As such, processes for VNF setting requests from the LCM to clouds can be standardized.

In performing VNF setting as described above, there is no need for the LCM 100 to recognize or manage whether the cloud is a type 1 cloud or a type 2 cloud. As such, the load on the LCM 100 is lessened.

Further, the cloud adapter 200 provides a management ID for the VNF setting request to the LCM 100. As such, there is no need for the cloud adapter 200 to manage the processing status of the VNF setting, so the performance (specifications) of the cloud adapter 200 can be constrained.

Furthermore, the cloud adapter 200 acquires a query regarding the processing status of the VNF setting from the LCM 100 using the management ID created when the VNF setting was performed. The cloud adapter 200 checks the processing status of the VNF setting in the cloud group 300 in accordance with the acquired management ID and provides the check result to the LCM 100.

In processing the query regarding the processing status of the VNF setting in the communication network system including the cloud adapter 200 according to the present embodiment, the cloud adapter 200 recognizes whether the deployment destination is either a type 1 cloud or a type 2 cloud on the basis of the management ID. As such, there is no need for the LCM 100 to recognize or manage whether the cloud is a type 1 cloud or a type 2 cloud and the query processing in the LCM 100 can be standardized.

Figure 2B:
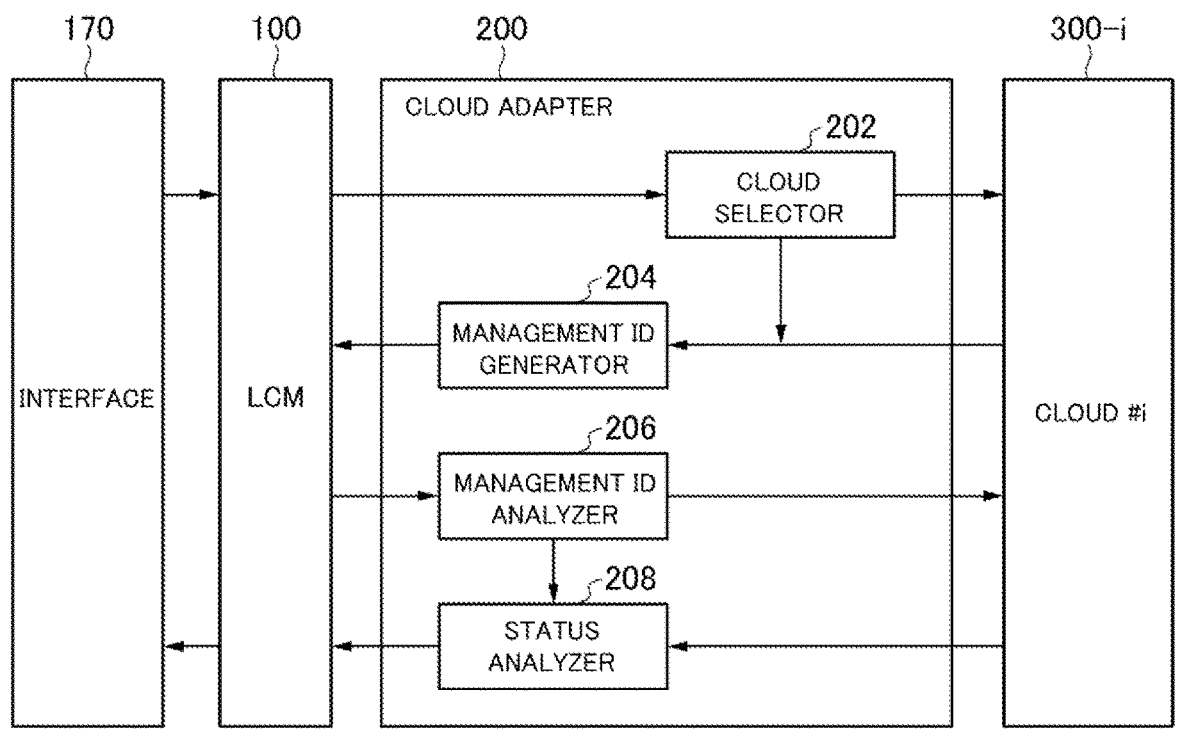
FIG. 2B is a functional block diagram illustrating the configuration of the cloud adapter according to the present embodiment.

FIG. 2B is a functional block diagram illustrating the configuration of the cloud adapter 200 according to the present embodiment. The cloud adapter 200 comprises a cloud selector 202, a management ID generator 204, a management ID analyzer 206, and a status analyzer 208.

Upon the cloud adapter 200 acquiring the request for VNF setting from the LCM 100, the cloud selector 202 selects in which of a type 1 cloud and a type 2 cloud to perform the VNF setting. Furthermore, in cases where there are multiple type 1 clouds or are multiple type 2 clouds, one cloud thereamong (this is considered to be "cloud #i" in FIG. 2B following the example in FIG. 1) may be decided on as the cloud that performs VNF setting.

For example, the cloud selector 202 can select a cloud on the basis of the catalog attached to the VNF deployment (creation) request from the LCM 100. The VNF deployment request from the LCM 100 may be provided from the application service provider through the interface 170.

The cloud adapter 200 can request VNF setting of the selected cloud #i with the cloud selector 202.

The management ID generator 204 creates a management ID for managing the processing status of the VNF setting request from the LCM 100. The management ID is created on the basis of the cloud of which VNF setting is requested (particularly, whether the cloud is type 1 or type 2) and the job ID or the release name and job type obtained from the cloud #i when VNF setting was requested (a specific example shall be discussed below). The created management ID can be provided from the cloud adapter 200 to the LCM 100.

When the cloud adapter 200 acquires the query regarding the processing status of the VNF setting (for example, VNF creation) from the LCM 100, the management ID that was created when the VNF setting was requested is attached to the query.

The management ID analyzer 206 analyzes the management ID attached to the query. The management ID analyzer 206 obtains the cloud of which VNF setting has been requested (particularly, whether or not the cloud is a type 1 cloud or a type 2 cloud) and the job ID obtained when VNF setting was requested or the release name and job type (a specific example shall be discussed below).

The cloud adapter 200 can query a type 1 cloud for the processing status of the VNF setting (for example, VNF creation) according to the job ID with the management ID analyzer 206. Alternatively, the cloud adapter 200 can query a type 2 cloud for full information concerning the release name with the management ID analyzer 206 (a specific example shall be discussed below).

For a type 1 cloud, the status analyzer 208 can make the processing status of the VNF setting (for example, VNF creation) acquired with the job ID the status of the VNF setting as-is (for example, whether the status is "completed" or "started").

The status analyzer 208 extracts the processing status of the request for VNF setting (in particular, VNF creation) according to the job type from the full information with the release name for the type 2 cloud. The extracted processing status can be made the status of the VNF setting (for example, whether the status is "completed" or "started") (a specific example shall be discussed below).

The cloud adapter 200 can provide the status of the VNF setting to the LCM 100 with the status analyzer 208. The LCM 100 can further provide the status of the VNF setting to the application service provider through the interface 170.

The operation of a type 1 cloud and a type 2 cloud on the request for VNF setting in relation to the management ID shall be explained next. This shall be explained with VNF creation as the VNF setting, but the same applies to VNF deletion or a VNF change.

Figure 3A:
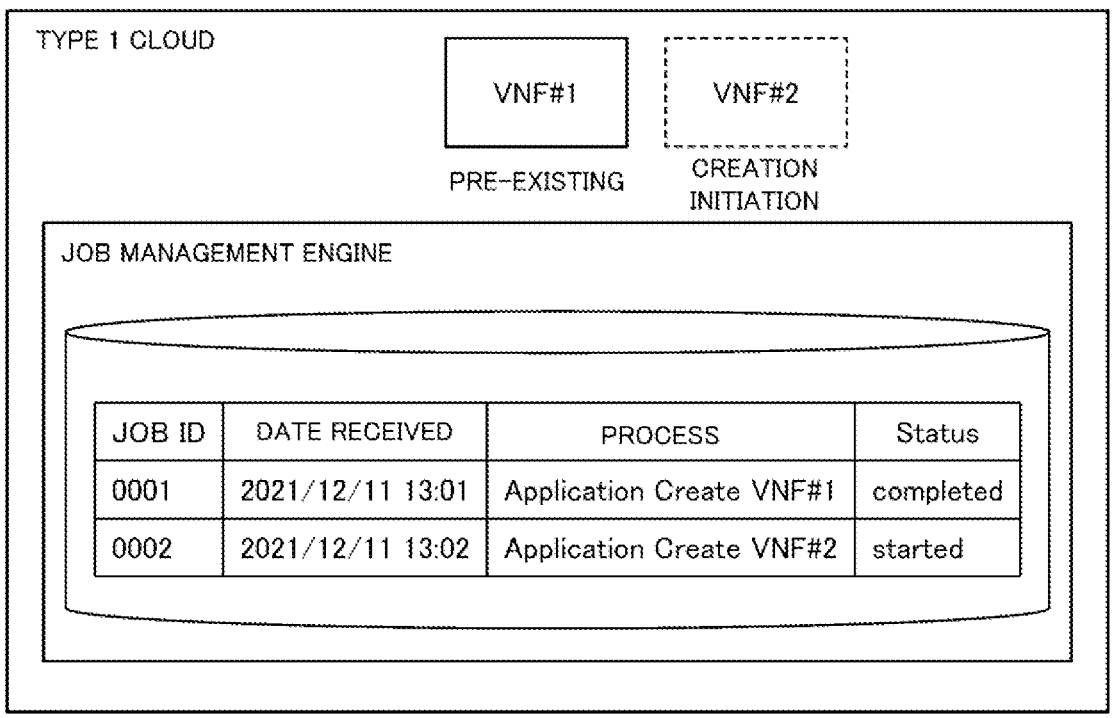
FIG. 3A explains an example of VNF setting initiation in a type 1 cloud.

FIG. 3A explains an example of VNF setting initiation in a type 1 cloud. The details of the job history stored in the job management engine which a type 1 cloud comprises are, for example, as follows.

A first VNF ("VNF #1") has already been created (is pre-existing) in a container, so the status of the requested creation processing (job ID "0001") for VNF #1 is "completed". In contrast, the status of the requested creation processing (job ID "0002") for a second VNF ("VNF #2") is not complete and is "started".

Figure 3B:
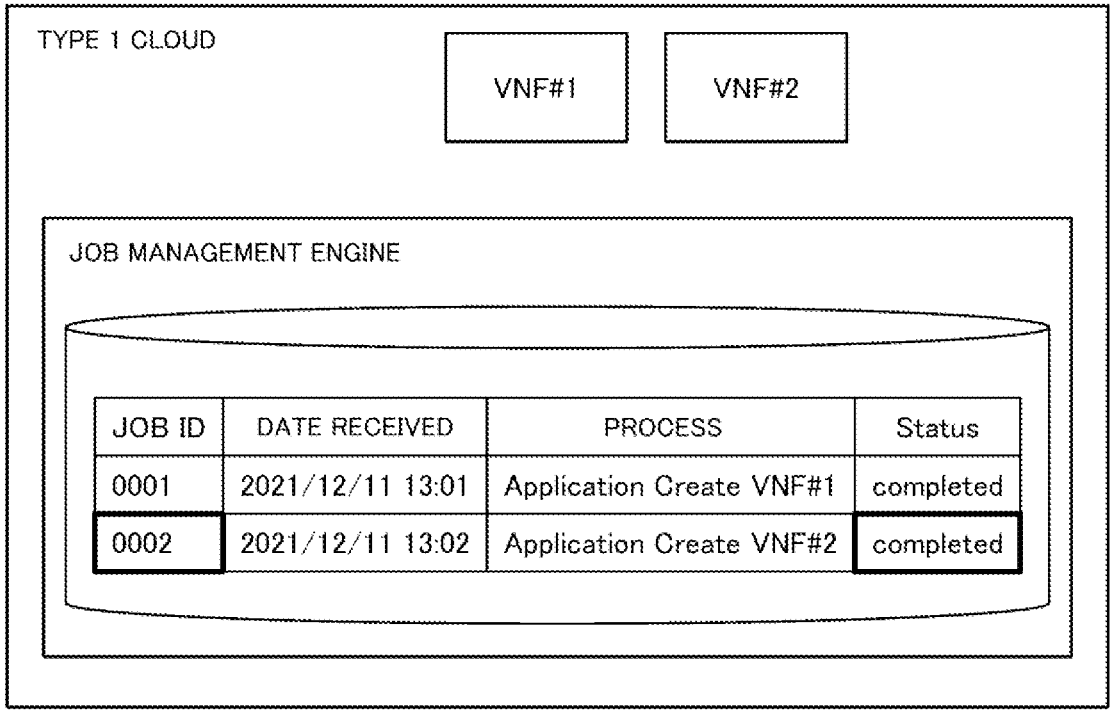
FIG. 3B explains an example of VNF setting completion in a type 1 cloud.

FIG. 3B explains an example of VNF setting completion in the same type 1 cloud as FIG. 3A.

The status of the requested creation processing for VNF #2 (job ID "0002") is "completed". That is, VNF #2 has been created in the container.

This makes it possible for the type 1 cloud to be queried for the processing status of the VNF setting using the job ID. For example, upon the job ID being designated as "0002" and querying the processing status, "started" is returned if the status is as in FIG. 3A and "completed" is returned if the status is as in FIG. 3B.

Figure 4A:
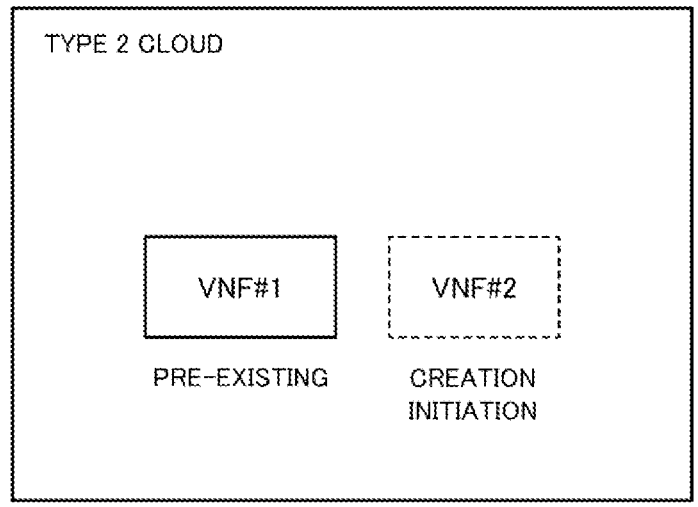
FIG. 4A explains an example of VNF setting initiation in a type 2 cloud.

FIG. 4A explains an example of VNF setting initiation in a type 2 cloud. VNF #1 has been created in a container (is pre-existing). In contrast, the creation processing for VNF #2 is not complete.

Figure 4B:
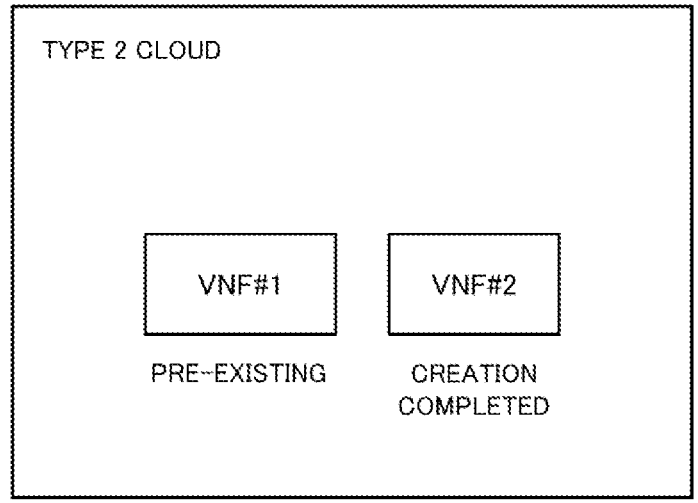
FIG. 4B explains an example of VNF setting completion in a type 2 cloud.

FIG. 4B explains an example of VNF setting completion in the same type 2 cloud as FIG. 4A. The creation processing for VNF #2 is complete. However, the type 2 cloud does not comprise a job management engine and querying of the status using the job ID cannot be performed.

An example of status acquisition using a Kubernetes command in a type 2 cloud shall be explained below.

Figure 5:
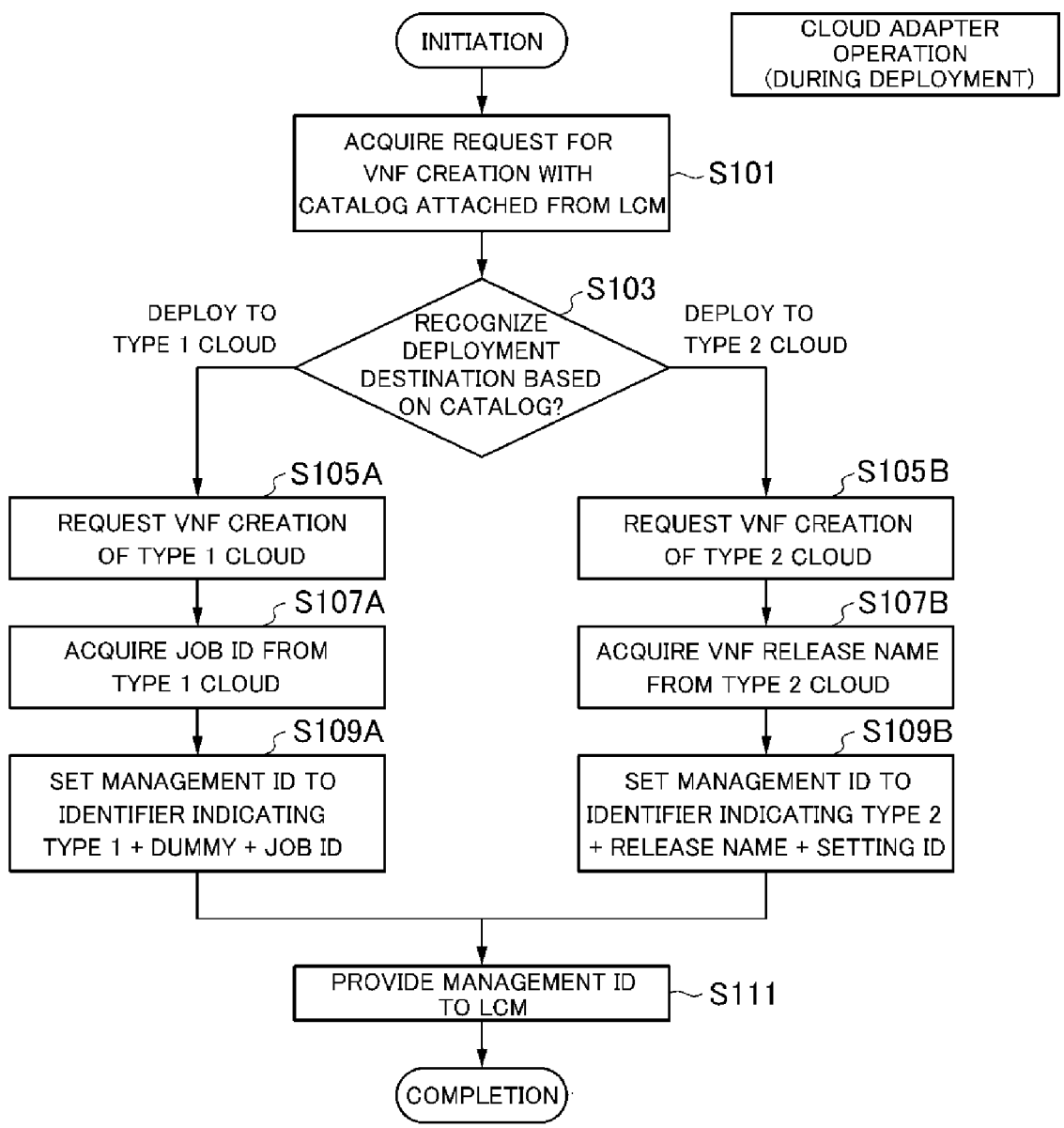
FIG. 5 is a flowchart that explains the operation in the cloud adapter according to the present embodiment when VNF setting has been requested.

The operation when VNF setting has been requested in the cloud adapter (see reference number 200 in FIG. 2A) according to the present embodiment shall be explained with reference to the flow chart in FIG. 5. In particular, a request for VNF creation (deployment) and management ID creation shall be explained in detail. The management ID in the present explanation is an example and the number of digits or the display format (such as letters, numbers, or symbols) of the elements (cloud type or job type) constituting the management ID are not limited to the present example.

The LCM (see reference number 100 in FIG. 2A) may manage the management ID in type 1 clouds and the management ID in type 2 clouds without distinction as long as these are both represented with a shared format.

The cloud adapter 200 acquires, from the LCM 100, the request for VNF creation to which the catalog is attached (reference number S101).

Next, based on the attached catalog, the cloud adapter 200 recognizes which of a type 1 cloud and a type 2 cloud the deployment destination is (reference number S103). Embodiments wherein the cloud adapter 200 determines the deployment destination are also possible.

When the deployment destination is a type 1 cloud, the cloud adapter 200 requests VNF creation of the type 1 cloud (reference number S105A).

The cloud adapter 200 can request VNF creation of the type 1 cloud by transmitting, for example, a "Robin app create" command thereto.

The cloud adapter 200 acquires a job ID for the requested VNF creation from the type 1 cloud of which the VNF creation has been requested (reference number S107A). In the example of VNF #2 in FIG. 3A, the job ID is "0002".

The cloud adapter 200 creates a management ID which links an identifier indicating the type 1 cloud, a dummy, and the job ID (reference number S109A). The management ID may be created by the management ID generator 204 in FIG. 2B.

Here, the identifier indicates whether a cloud is a type 1 cloud or a type 2 cloud. For example, the character string "AAA" can be provided for type 1 clouds and the character string "BBB" can be provided for type 2 clouds. The cloud adapter 200 must store the category of the type 1 cloud and the type 2 cloud and the correspondence of the identifiers.

Further, when the i-th (i is a number no less than one) first type cloud has been selected, the deployment destination can be made, for example, "AAi".

The dummy is data of a predetermined number of digits. The dummy has no particular use in the present embodiment and is for aligning the lengths of the management ID in type 1 clouds and the management ID in type 2 clouds. Therefore, the format (number of digits and usable values) of the dummy is matched with the format of the release name of the VNF in type 2 clouds.

For example, the release name of a VNF in type 2 clouds is provided as a five-digit number (a decimal number from 00000 to 99999). In this case, when the deployment destination is a type 1 cloud, the dummy in the management ID is also made a five-digit number (a decimal number from 00000 to 99999). The numbers themselves have no meaning and therefore can be selected arbitrarily. For example, a decimal number from 00000 to 99999 may be arbitrarily selected.

According to the abovementioned example, the management ID for the creation of VNF #2 in the type 1 cloud is, for example, "AAAxxxxx0002". Here, "AAA" is a character string and xxxxx is a five-digit number from 00000 to 99999.

When the recognized deployment destination is a type 2 cloud, the cloud adapter 200 requests VNF creation of the type 2 cloud (reference number S105B).

In particular, regarding type 2 clouds, the cloud adapter 200 can transmit, for example, Kubernetes commands for VNF creation, deletion, and changes to a type 2 cloud to request VNF setting.

Whether the setting details are creation, deletion, changes, or the like is called the job type. Further, the identifiers indicating the job types are also described as setting IDs. Numerical values can be allocated for the setting IDs. For example, creation, deletion, and change can respectively be allocated "1111", "2222", and "3333". The cloud adapter 200 must store the job types and the correspondence of the allocated numerical values (setting IDs).

The cloud adapter 200 acquires the release name of the VNF to be created from the type 2 cloud which accepted the request for VNF creation designated by the job type (reference number S107B). The length of the release name is predetermined. For example, the release name is a five-digit number from 00000 to 99999, but is not limited thereto.

Note that, different from the job ID, queries of the status of VNF creation using the release name cannot be made.

The cloud adapter 200 creates a management ID which links the identifier indicating a type 2 cloud, a dummy, and the setting ID (reference number S109B). The management ID may be created by the management ID generator 204 in FIG. 2B.

According to the abovementioned example, the management ID for VNF creation in a type 2 cloud is, for example, "BBByyyyy1111". Here, "BBB" is a character string and yyyyy is the release name of the VNF to be created and is a five-digit number from 00000 to 99999.

The cloud adapter 200 provides the management ID for the type 1 cloud or the type 2 cloud to the LCM (reference number S111).

According to the operation discussed above, upon VNF setting being requested, the cloud adapter 200 creates a request according to the type of the addressed cloud, so the LCM 100 does not recognize or manage whether the cloud is a type 1 cloud or a type 2 cloud.

Furthermore, the cloud adapter 200 provides a management ID for managing the processing status of the request for VNF setting to the LCM 100. As such, the cloud adapter 200 does not manage the processing status of the VNF setting.

Figure 6:
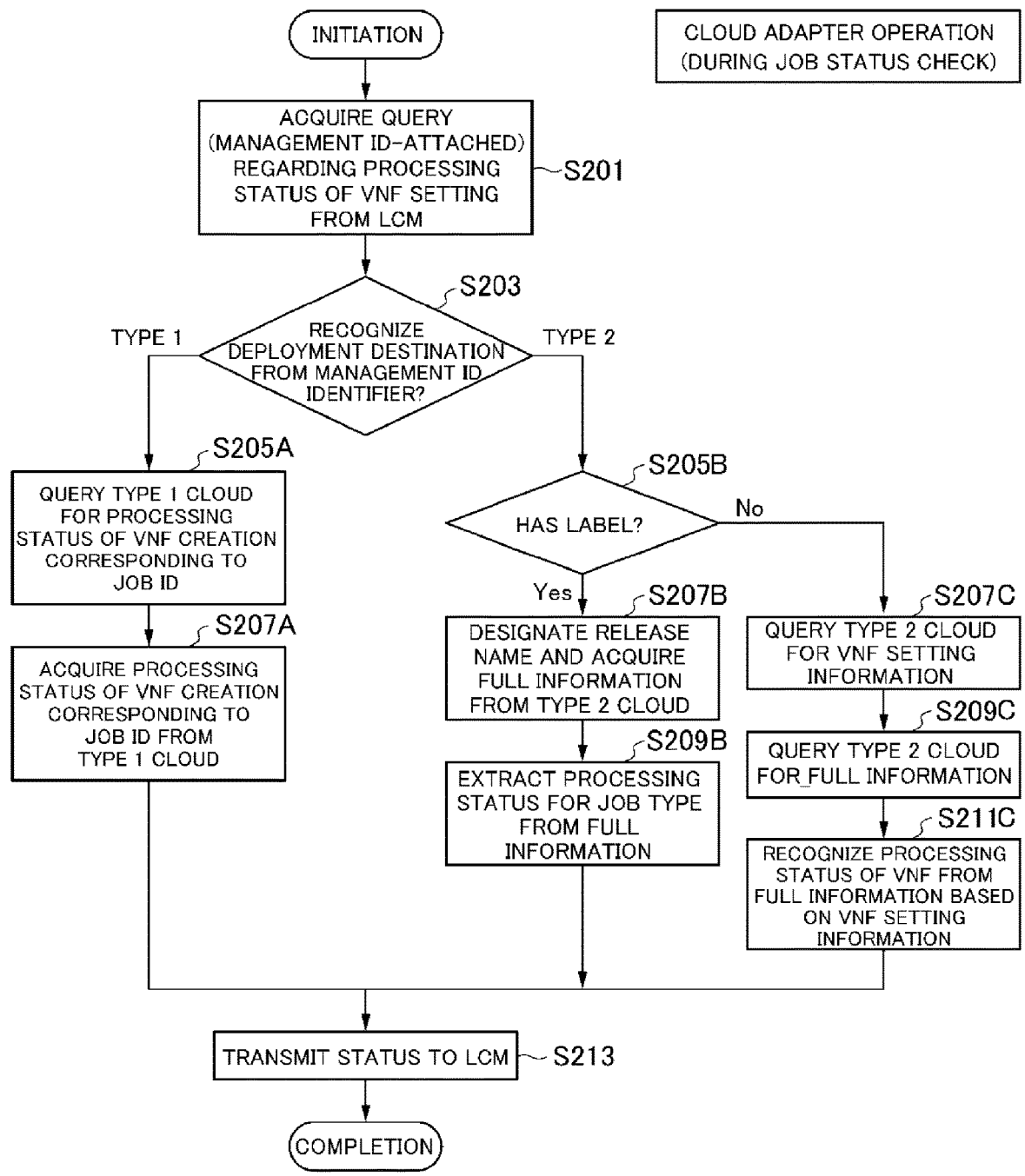
FIG. 6 is a flowchart that explains the operation in the cloud adapter according to the present embodiment when the processing status of VNF setting has been queried.

The operation when the processing status (job status) of VNF setting has been queried in the cloud adapter (see reference number 200 in FIG. 2A) according to the present embodiment shall be explained with reference to the flowchart in FIG. 6. In particular, the operation when the processing status of VNF creation (deployment) has been queried shall be explained in detail.

The cloud adapter 200 acquires a query regarding the processing status of the VNF creation from the LCM (see reference number 100 in FIG. 2A) (reference number S201).

The management ID that was created when the VNF setting was requested is attached to this query. A check request regarding the processing status of the VNF creation may be performed periodically and may be sent from the application service provider.

Based on the identifier portion of the management ID, the cloud adapter 200 recognizes which of a type 1 cloud and a type 2 cloud the deployment destination is (reference number S203). The cloud adapter 200 stores the category of the type 1 cloud and the type 2 cloud and the correspondence of the identifiers. For example, the cloud adapter 200 recognizes that the deployment destination is a type 1 cloud if the identifier is the text string "AAA" and recognizes that the deployment destination is a type 2 cloud if the identifier is the text string "BBB". This process may be carried out in the management ID analyzer 206 in FIG. 2B.

Further, for example, if the text string is "AAi" (i is a number that is one or greater), the deployment destination can be recognized as the i-th type 1 cloud.

When the determined deployment destination is a type 1 cloud, the cloud adapter 200 queries the type 1 cloud for the processing status of the VNF creation corresponding to the job ID (reference number S205A). The management ID links the identifier indicating a type 1 cloud, the dummy, and the job ID, so the job ID can be obtained by removing the identifier and the dummy from the management ID. In the example of VNF #2 in FIG. 3A, the management ID is "AAAxxxxx0002" and the dummy length is provided beforehand, so the job ID is "0002". Extraction of the job ID may be performed by the management ID analyzer 206 in FIG. 2B.

The cloud adapter 200 acquires the processing status of the VNF creation corresponding to the job ID from the type 1 cloud (reference number S207A). For example, "started" is returned if the status is as in FIG. 3A, and "completed" is returned if the status is as in FIG. 3B.

The returned processing status is made the status of the VNF creation as is, so there is no particular need for processing regarding the type 1 cloud by the status analyzer 208 in FIG. 2B.

We shall now move to an explanation of cases where the determined deployment destination is a type 2 cloud. For type 2 clouds, the processing status of the VNF setting is acquired using the release name and the job type. Extraction of the release name and job type may be performed by the management ID analyzer 206 in FIG. 2B.

When the determined deployment destination is a type 2 cloud, the cloud adapter 200 judges as to the presence or absence of a "label" and sorts cases in which there is a label and cases in which there is not a label (reference number S205B). Here, the presence or absence of the "label" is whether or not each piece of information of the VNF is maintaining (there is a label) or is not maintaining (there is not a label) the release name for the request for VNF creation as a label which identifies itself or other VNFs.

The presence or absence of a label in each cloud is provided to the cloud adapter 200 beforehand, but processing when this is not the case shall be discussed below.

First, cases where the deployment destination type 2 cloud has a label shall be explained.

Differing from the job ID for a type 1 cloud, even if a query regarding the status of VNF creation is made using just the release name for a type 2 cloud, the type 2 cloud does not return the processing status of the VNF setting.

Thus, the cloud adapter 200 first designates the release name for the type 2 cloud which is the deployment destination and acquires full information pertaining to the VNF represented by the release name (label) (reference number S207B).

For the type 2 cloud, for example, the full information of the VNF corresponding to the release name can be acquired by providing a Kubernetes command which has designated the release name (yyyyy) (for example, "kubectl get all yyyyy") to the type 2 cloud.

Next, the cloud adapter 200 extracts the processing status pertaining to the job type from the acquired full information (reference number S209B). In the example in FIG. 5, as the status, the processing status ("started" or "completed") pertaining to the "creation" job type (the corresponding setting ID is "1111") is extracted from the acquired full information. This process may be performed by the status analyzer 208 in FIG. 2B.

Next, cases where the deployment destination type 2 cloud does not have a label shall be explained.

First, the cloud adapter 200 queries the deployment destination type 2 cloud for the VNF setting information (manifest) (reference number S207C).

For example, for type 2 clouds, the manifest can be acquired by transmitting a command such as "Helm get manifest" to the type 2 cloud.

Next, the cloud adapter 200 queries the full information (reference number S209C). For example, the full information can be acquired by transmitting a command such as "Helm get all" to the type 2 cloud.

Based on the setting information of the VNF which is the target, the cloud adapter 200 acquires only the information of the VNF which is the target from the full information. Then, the cloud adapter 200 recognizes the processing status (reference number S211C). The processing status is made the status of the VNF creation being queried.

The cloud adapter 200 transmits the status of the VNF creation to the LCM 100 in a type 1 cloud or a type 2 cloud (reference number S213).

According to the above-discussed operation of the cloud adapter 200 when the processing status (job status) of the VNF setting is queried, the cloud adapter 200 determines which of a type 1 cloud and a type 2 cloud the deployment destination is based on the management ID. As such, in job status checking, the LCM 100 does not recognize or manage whether the cloud is a type 1 cloud or a type 2 cloud.

Furthermore, the cloud adapter 200 is provided with the management ID from the LCM 100 and provides the status of the corresponding VNF to the LCM 100. As such, the cloud adapter 200 does not perform job management of the VNF in response to the job status check request.

When the presence or absence of a label has not been provided beforehand, the status of the VNF creation can be obtained for a type 2 cloud by processing "without a label", even if that type 2 cloud has a label.

Alternatively, if an error is returned for the full information acquisition request wherein "has a label" is designated as the release name (reference number S207B), the cloud can be considered to be "without a label".

Figure 7:
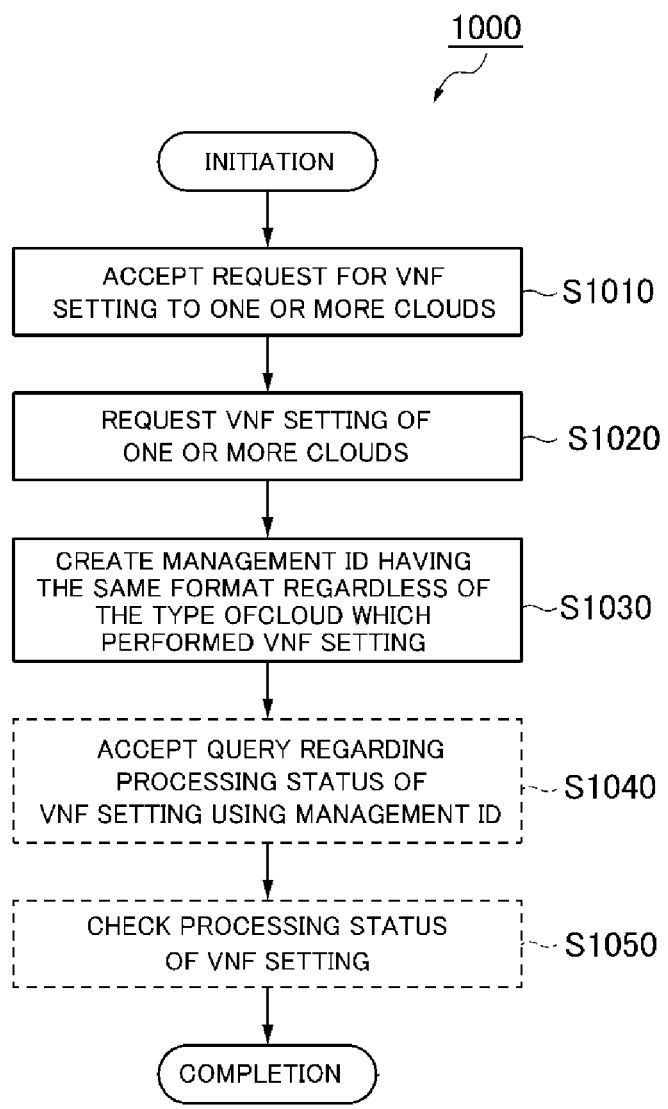
FIG. 7 is a flowchart illustrating an example of the VNF setting method according to the present embodiment.

VNF setting method 1000 according to the present embodiment shall be explained with reference to FIG. 7. This method includes: accepting a request for VNF setting for one or more clouds (reference number S1010); requesting VNF setting for one or more clouds (reference number S1020); and creating a management ID of the same format, regardless of the type of each cloud for which VNF setting was performed (reference number S1030).

In order to query the processing status of the next VNF setting, the VNF setting method 1000 can further include: accepting a query regarding the processing status of the VNF setting using a management ID (reference number S1040); and checking the processing status (reference number S1050).

Furthermore, the present disclosure also includes a program for executing the above-discussed VNF setting method 1000 in a system. The program may be provided by being recorded on a computer-readable non-transitory storage medium.

Figure 8:
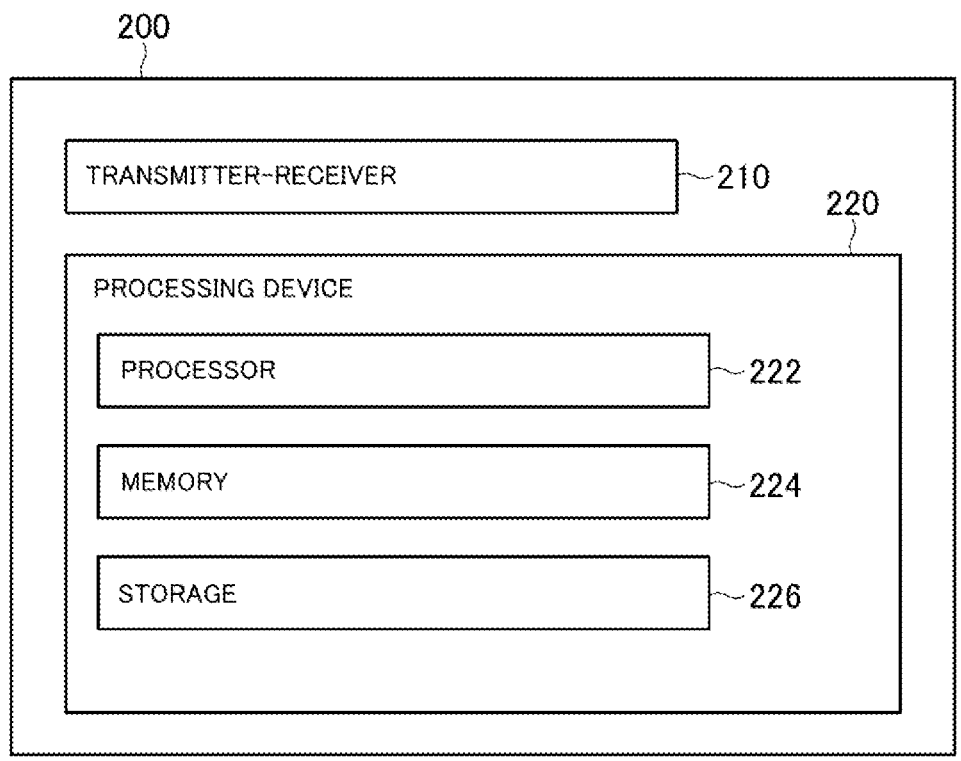
FIG. 8 is a block diagram illustrating the configuration of the cloud adapter shown in FIG. 2.

Further, the cloud adapter 200 according to the present embodiment can be realized by the apparatus shown in the block diagram of FIG. 8.

The cloud adapter 200 in FIG. 8 includes a transmitter-receiver 210 and a processing device 220.

The transmitter-receiver 210 transmits and receives data between the LCM and the one or more clouds.

The processing device 220 includes a processor 222 and a memory 224. There may be one or more processors 222 and memories 224. The processing device 220 may further include a storage 226. The processing device 220 operates the transmitter-receiver 210 and can also execute processing as a cloud adapter with the processor 222 and the memory 224.

The cloud adapter 200 may further include configurations not shown in FIG. 8.

The present disclosure is not limited to the embodiments discussed above and includes various modified examples in which constituent elements have been added, removed, or replaced with respect to the configurations discussed above. Further, the examples can be combined variously.

The term "connection" used in the present explanation refers to a logical connection for the purpose of communication. For example, "B connected to A" means that A and B are logically connected such that communication therebetween is possible. There is no need for A and B to be directly connected physically by a physical cable or the like and multiple pieces of equipment or radio communications may be disposed between A and B.

Furthermore, the present disclosure includes the following aspects.

A communication network system comprising:
  a life cycle manager (LCM) that transmits a request for virtual network function (VNF) setting to one or more clouds; and
  a cloud adapter that mediates communication between the LCM and the cloud to which the request is addressed, wherein the cloud adapter
    creates, based on a response to the request from the cloud to which the request is addressed, a common-format management ID independent of the type of the cloud to which the request is addressed and transmits the management ID to the LCM.

The communication network system described in [1], wherein the LCM transmits a query regarding a processing status of the request to the cloud adapter, including the management ID, and
  the cloud adapter
    recognizes the cloud to which the query is addressed on the basis of the management ID and
    queries the cloud to which the query is addressed such that the processing status is returned.

The communication network system described in [2], wherein
  the LCM transmits the request to a type 1 cloud and to a type 2 cloud, the type 1 cloud including a job ID for querying a processing status for the request in a response to the request and the type 2 cloud not including a job ID for querying a processing status of the VNF setting as a response to the request, and
  for the response from the type 1 cloud, the cloud adapter includes the job ID in the management ID,
  for the response from the type 2 cloud, the cloud adapter includes, in the management ID, a pre-associated setting ID in accordance with the type of the request, and
  when the address of the query is the type 1 cloud, the cloud adapter transmits the job ID included in the query to the type 1 cloud and
  when the address of the query is the type 2 cloud, the cloud adapter uses a setting ID included in the query to create a query for the type 2 cloud.

The communication network system described in [3], wherein the management ID is fixed-length data and the cloud adapter includes meaningless dummy information in the management ID such that the management ID of the type 1 cloud and the management ID of the type 2 cloud become the same fixed length.

The communication network system described in [1], wherein the cloud adapter
    recognizes the cloud to which the request is addressed based on the request and
    changes the request into a request in accordance with the cloud to which the request is addressed.

The communication network system described in [1], wherein the cloud adapter includes an identifier indicating the address of the request in the management ID.

The communication network system described in any one of [1] to [6],
  wherein the VNF setting is VNF creation, VNF deletion, or VNF change.

A cloud adapter comprising one or more processors,
  wherein mediation of communication between a life cycle manager (LCM) that transmits a request for virtual network function (VNF) setting to one or more clouds and the cloud to which the request is addressed is executed by at least one of the one or more processors, and in the mediation of communication, creation, on the basis of a response to the request from the cloud to which the request is addressed, of a common-format management ID independent of the type of the cloud to which the request is addressed and transmission of the management ID to the LCM are performed.

The cloud adapter described in [8], wherein recognition, for a query regarding a processing status of the request, of the cloud to which the query is addressed on the basis of the management ID included in the query and querying of the cloud to which the query is addressed such that the processing status is returned are performed by at least one of the one or more processors.

A method for mediating communication between a life cycle manager (LCM) that transmits a request for virtual network function (VNF) setting to one or more clouds and the cloud to which the request is addressed, wherein, in the mediation of communication, creation, on the basis of a response to the request from the cloud to which the request is addressed, of a common-format management ID independent of the type of the cloud to which the request is addressed and transmission of the management ID to the LCM are performed.

The method described in [10], wherein recognition, for a query regarding a processing status of the request, of the cloud to which the query is addressed on the basis of the management ID included in the query and querying of the cloud to which the query is addressed such that the processing status is returned are performed.

REFERENCE SIGNS LIST

1 Communication network system
100 LCM (Life Cycle Manager)
170 Interface
180 Base station
200 Cloud adapter
202 Cloud selector
204 Management ID generator
206 Management ID analyzer
208 Status analyzer
210 Transmitter-receiver
220 Processing device
222 Processor
224 Memory
226 Storage
300 Cloud group
300-1, 300-i, 300-N Clouds
900 Information processing apparatus

The invention claimed is:

1. A communication network system comprising:
a life cycle manager (LCM) that transmits a request for virtual network function (VNF) setting to one or more clouds; and
a cloud adapter that mediates communication between the LCM and the cloud to which the request is addressed,
wherein the cloud adapter
creates, based on a response to the request from the cloud to which the request is addressed, a common-format management ID independent of the type of the cloud to which the request is addressed and
transmits the management ID to the LCM.

2. The communication network system according to claim 1,
wherein the LCM transmits a query regarding a processing status of the request to the cloud adapter, including the management ID, and
the cloud adapter
recognizes the cloud to which the query is addressed on the basis of the management ID and
queries the cloud to which the query is addressed such that the processing status is returned.

3. The communication network system according to claim 2,
wherein the LCM transmits the request to a type 1 cloud and to a type 2 cloud, the type 1 cloud including a job ID for querying a processing status for the request in a response to the request and the type 2 cloud not including a job ID for querying a processing status of the VNF setting as a response to the request, and
for the response from the type 1 cloud, the cloud adapter includes the job ID in the management ID,
for the response from the type 2 cloud, the cloud adapter includes, in the management ID, a pre-associated setting ID in accordance with the type of the request, and
when the address of the query is the type 1 cloud, the cloud adapter transmits the job ID included in the query to the type 1 cloud and
when the address of the query is the type 2 cloud, the cloud adapter uses the setting ID included in the query to create a query for the type 2 cloud.

4. The communication network system according to claim 3,
wherein the management ID is fixed-length data and
the cloud adapter includes meaningless dummy information in the management ID such that the management ID of the type 1 cloud and the management ID of the type 2 cloud become the same fixed length.

5. The communication network system according to claim 1,
wherein the cloud adapter
recognizes the cloud to which the request is addressed based on the request and
changes the request into a request in accordance with the cloud to which the request is addressed.

6. The communication network system according to claim 1,
wherein the cloud adapter includes an identifier indicating the address of the request in the management ID.

7. The communication network system according to claim 1,
wherein the VNF setting is VNF creation, VNF deletion, or VNF change.

8. A cloud adapter comprising one or more processors,
wherein mediation of communication between a life cycle manager (LCM) that transmits a request for virtual network function (VNF) setting to one or more clouds and the cloud to which the request is addressed is executed by at least one of the one or more processors, and
in the mediation of communication,
creation, on the basis of a response to the request from the cloud to which the request is addressed, of a common-format management ID independent of the type of the cloud to which the request is addressed and transmission of the management ID to the LCM are performed.

9. The cloud adapter according to claim 8, wherein recognition, for a query regarding a processing status of the request, of the cloud to which the query is addressed on the basis of the management ID included in the query and querying of the cloud to which the query is addressed such that the processing status is returned are performed by at least one of the one or more processors.

10. A method for mediating communication between a life cycle manager (LCM) that transmits a request for virtual network function (VNF) setting to one or more clouds and the cloud to which the request is addressed, wherein, in the mediation of communication, creation, on the basis of a response to the request from the cloud to which the request is addressed, of a common-format management ID independent of the type of the cloud to which the request is addressed and transmission of the management ID to the LCM are performed.

11. The method according to claim 10, wherein recognition, for a query regarding a processing status of the request, of the cloud to which the query is addressed on the basis of the management ID included in the query and querying of the cloud to which the query is addressed such that the processing status is returned are performed.

* * * * *